United States Patent [19]

Rumley

[11] Patent Number: 4,961,117
[45] Date of Patent: Oct. 2, 1990

[54] DOCUMENT SCANNER

[75] Inventor: Stuart D. Rumley, Redwood City, Calif.

[73] Assignee: New DEST Corporation, San Jose, Calif.

[21] Appl. No.: 117,971

[22] Filed: Nov. 13, 1987

[51] Int. Cl.$^5$ .............................................. H04N 1/04
[52] U.S. Cl. .................................... 358/461; 358/466; 358/475; 358/463
[58] Field of Search ............... 358/292, 284, 256, 282, 358/285, 464, 463, 461, 466, 475, 455, 462

[56] References Cited

U.S. PATENT DOCUMENTS

| | | | |
|---|---|---|---|
| 3,833,761 | 9/1974 | Hovek | 358/256 |
| 4,385,318 | 5/1983 | Miller | 358/282 |
| 4,466,021 | 8/1984 | Hibbard | 358/285 |
| 4,571,638 | 2/1986 | Schneider | 358/294 |
| 4,575,768 | 3/1986 | Sakai | 358/282 |
| 4,578,711 | 3/1986 | White | 358/285 |
| 4,623,923 | 11/1986 | Orbach | 358/166 |
| 4,647,976 | 3/1987 | Nakagaki | 358/213.13 |
| 4,700,236 | 10/1987 | Abe | 358/280 |
| 4,709,274 | 11/1987 | Tanioka | 358/282 |
| 4,727,434 | 2/1988 | Kawamura | 358/285 |
| 4,731,862 | 3/1988 | Tsuda | 358/282 |
| 4,779,029 | 10/1988 | Henderson | 358/28 |

Primary Examiner—Edward L. Coles, Sr.
Assistant Examiner—Jerome Grant
Attorney, Agent, or Firm—Flehr, Hohbach, Test, Albritton & Herbert

[57] ABSTRACT

A document scanner for utilization with a word processing and/or graphics processing equipment, such as a personal computer environment. The document scanner provides improved pixel compensation and gamma compensation techniques as well as improved control in the illumination process of the scanning of a document.

5 Claims, 7 Drawing Sheets

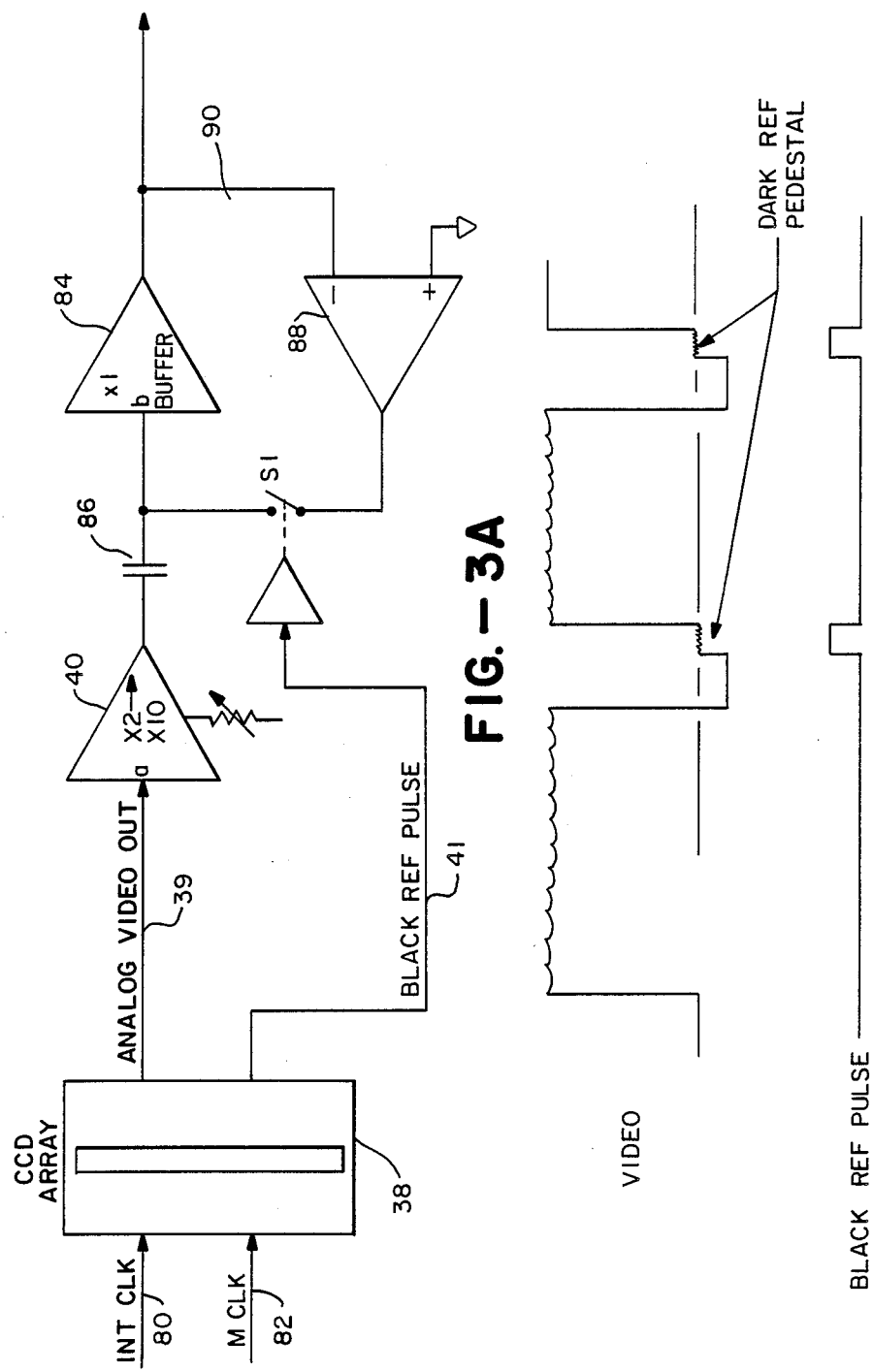

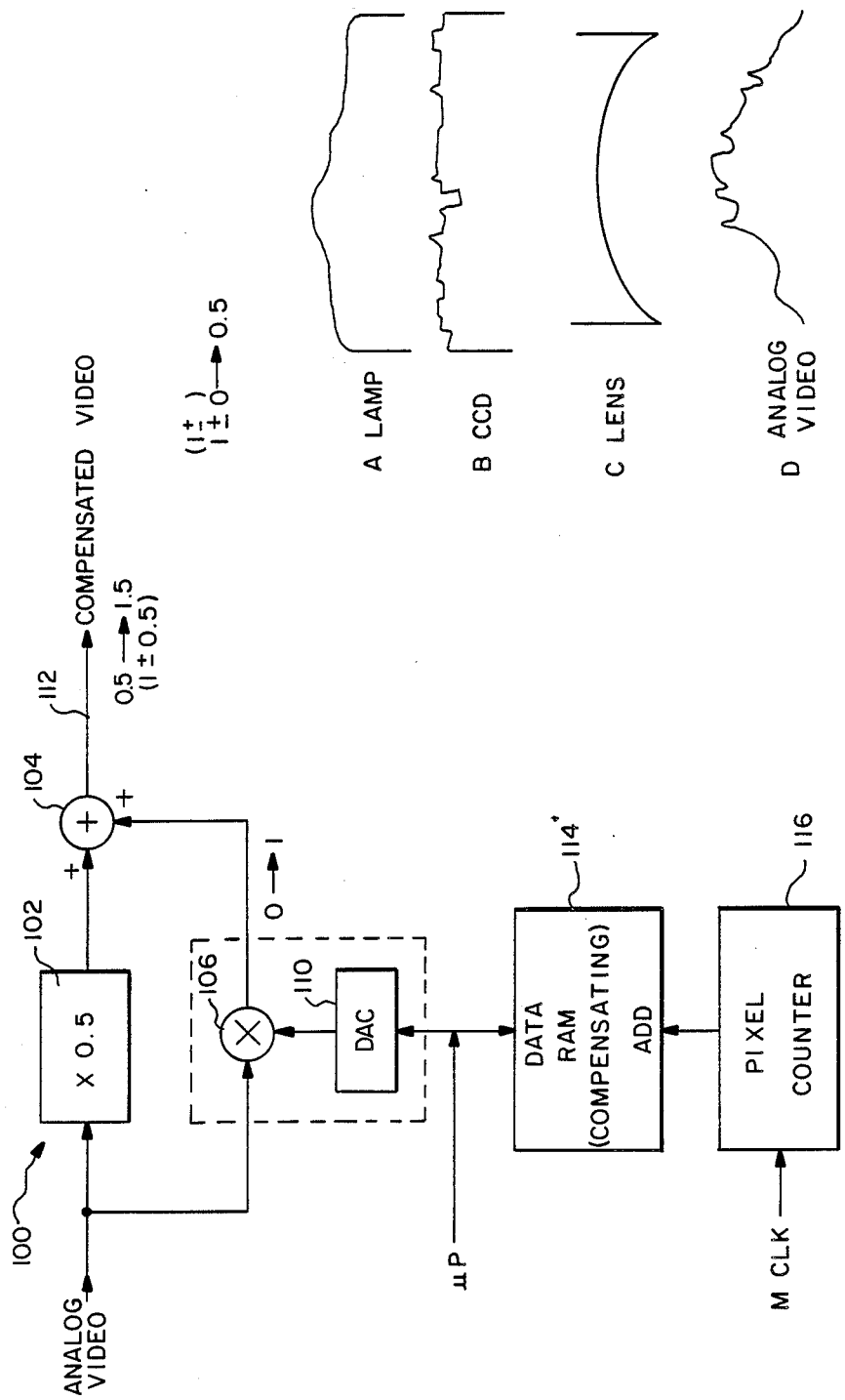

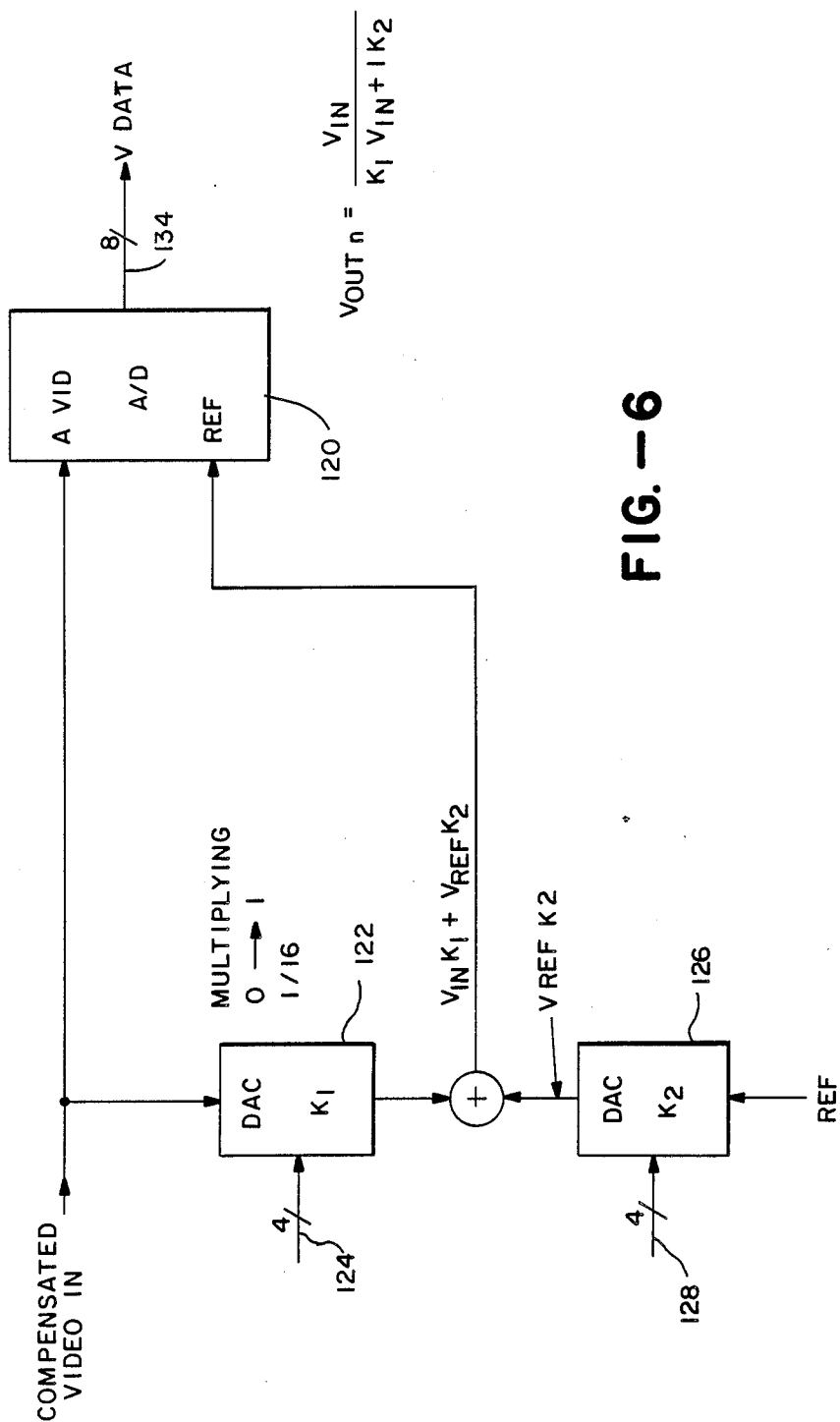
FIG.—6

DOCUMENT SCANNER

BACKGROUND OF THE INVENTION

The present invention relates to a document scanner.

Document scanners are increasingly becoming an important part of a word processing and/or personal computer environment. A document scanner receives some form of document having text, graphics, or continuous tone photographic information thereon. The document may be scanned utilizing some form of character recognition technique, typically optical character recognition. The document is scanned to provide for isolation segmentation and recognition of the graphics and/or text information. The scanner then provides suitable output control signals for input to any type of word processing or graphics processing work station equipment, such as a personal computer. The personal computer can then process the signals representing the scanned document for display, variation or any other use, as required.

It is very important for the document scanner to provide accurate output signals representative of the text and/or graphics information so that the scanned information can be accurately processed by the equipment.

It is, of course, desirable to provide input to the word and graphics processing equipment as accurately and as quickly as possible. One problem which appears in prior art document scanners is the ability to provide pixel correction in a real time environment, yet which are affordable to the user.

SUMMARY OF THE INVENTION

It is an object of the present invention to provide a document scanner for use in a word processor and/or personal computer environment.

A document scanner according to the present invention provides for improved pixel compensation and dynamic range gamma modification and thereby extended dynamic range is achieved by a compressing A/D conversion technique for improved video processing capabilities. A major feature of this device is its 8-bit grey scale capability for scanning continuous tone grey scale documents, such as photographs. The pixel compensation is not done at the time of manufacture like other scanners, but can be done automatically and continuously over the life of the machine. This gives a better product with less image artifacts at lower manufactured cost.

The document scanner provides bilevel, half-tone and grey scale scanning nodes. The transfer function can be easily modified by the user by changing the contents of a threshold RAM which acts as a look-up table.

A further aspect of the present invention is to provide a novel power supply and lamp driver control circuitry utilized in the initial scanning process for the present invention.

Other objects, features and advantages of the present invention will become apparent from the following detailed description when taken in conjunction with the accompanying drawings.

BRIEF DESCRIPTION OF THE DRAWINGS

FIG. 3A depicts a diagram of an optical and imaging circuit which forms a portion of FIG. 2.

FIG. 3B depicts a timing diagram for describing the operation of the circuit of FIG. 3A.

FIG. 4 depicts a diagram of a pixel compensation circuit according to the present invention.

FIG. 5 depicts compensation diagrams for describing the operation of the pixel compensation circuit of FIG. 4.

FIG. 6 depicts a gamma correction circuit according to the present invention.

DETAILED DESCRIPTION OF THE DRAWINGS

Figure 1:
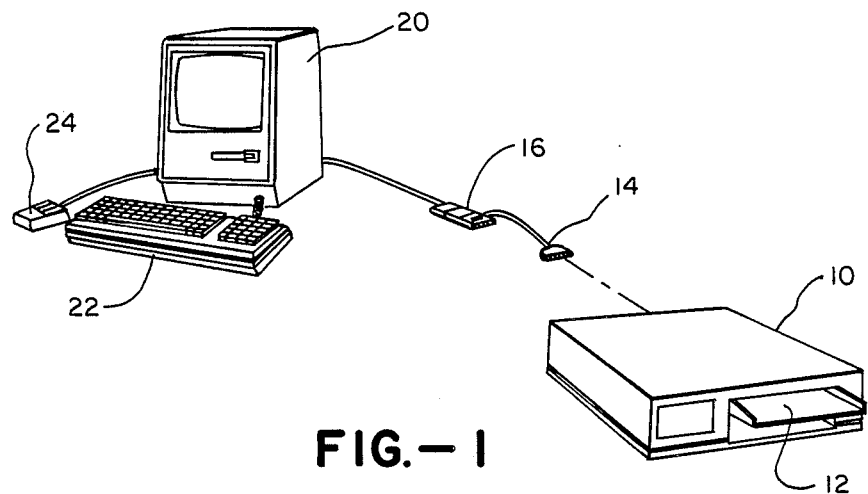
FIG. 1 depicts a block diagram of a document scanner according to the present invention utilized in a word processing or graphics environment.
Figure 1A:
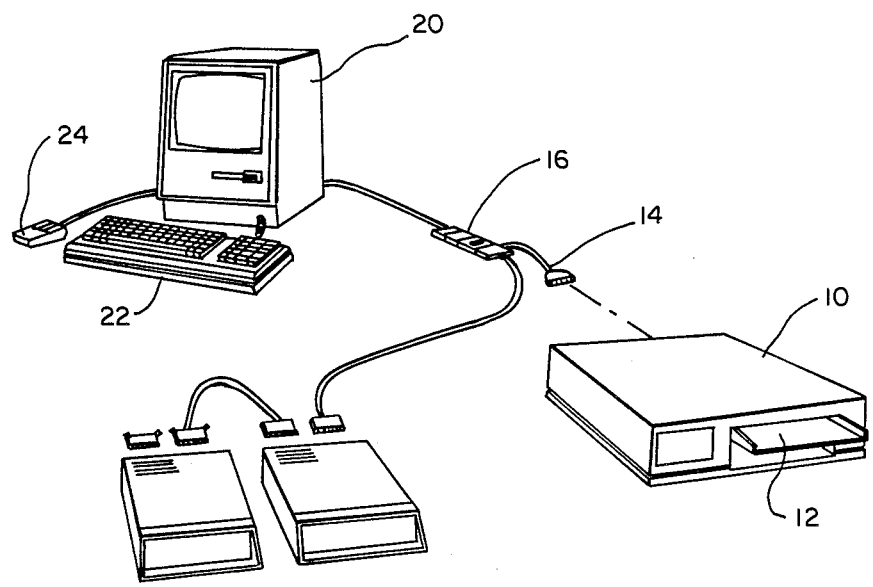
FIG 1A depicts a PC scan in chain with other SCSI devices.

FIG. 1 depicts a block diagram of a document scanner as utilized in a word processing or graphics PC (Personal Computer) type environment.

Document scanner 10 in FIG. 1 includes a tray 12 for receiving any form of document to be scanned. Document scanner 10 will provide suitable digital signals on cable 14 for input through a suitable terminator 16 for input into any type of PC 20 or any other type of word processing equipment.

Typically, the PC 20 could be a personal computer manufactured by any well known manufacturer such as Apple, International Business Machines and the like. The PC 20 also includes a keyboard 22 and a "mouse" 24, the operating details of which are well known in the art.

Other variations utilizing the document scanner 10 are of course possible, such as with other types of peripheral devices which are connected to equipment such as PC 20.

Figure 2:
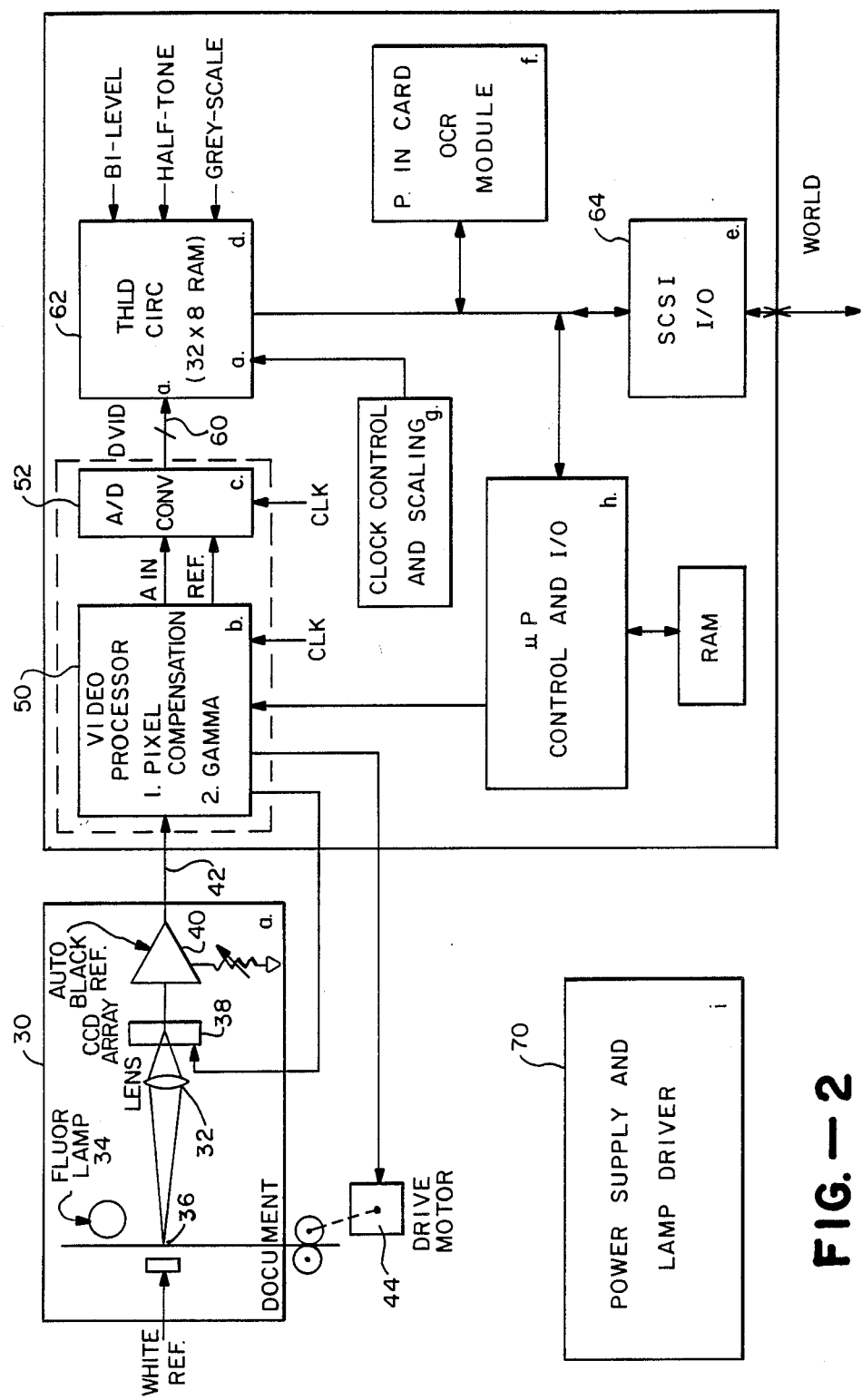
FIG. 2 depicts a block diagram of the document scanner of FIG. 1.

FIG. 2 depicts a block diagram of the document scanner 10 of FIG. 1. Document scanner 10 includes an optical and imaging circuit 30 which includes a lens 32 and some suitable form of illumination such as fluorescent lamp 34.

Optical and imaging circuit 30 will receive a document 36, and with suitable optical imaging techniques with lens 32, CCD array 38 and a preamplifier 40, generate suitable analog video signals on lead 42.

Associated with optical and imaging circuit 30 is a drive motor 44 for enabling document 36 to be appropriately scanned for generating the analog video data on lead 42.

According to one aspect of the invention, preamplifier circuit 40 provides automatic black reference correction, as will be described.

The analog video data on lead 42 is input to video processor 50, which includes pixel compensation circuits and compensation circuits for providing enhanced grey scale capability. The output of video processor 50 is input into analog to digital (A/D) circuit 52, which converts the analog compensated data into a digital format on lead 60.

The digital video data (DVID) on lead 60 is input to the threshold circuit 62 which, in one embodiment, is a 32K×8 bit RAM. Threshold circuit 62 provides the capability of bilevel thresholding, half-tone conversion and grey scale transfer function.

Bilevel thresholding is a processing technique to determine between white and black type of information on a document. Threshold circuit 62 stores data maps which, with suitable lookup techniques, provides for proper bilevel processing. FIG. 6 shows the bilevel peak detector 125(2) used to provide an adaptive reference for the A/D conversion.

Half-tone processing creates a "super" pixel which could contain any number of actual pixels—typically a matrix of 4×4, 4×8, or 8×8 is used. The grey scale data of the scanned document is transferred or converted to super pixels. The bilevel value of the pixels in the super pixel determine the apparent or perceived grey tone of the image when printed or displayed on bilevel printers and displays, similar to newspaper process of printing pictures when only black or white pixel data is available. Adaptive halftone reference 125(2) may be enabled to provide enhanced halftone performance on colored paper.

Grey scale transfer function merely provides any arbitrary and user definable transfer function for the 8-bit grey scale data. Typically, the RAM look-up table will provide a linear transfer function that provides reverse video ($\Phi\Phi$= white and FF=black) for compatibility with the so-called printer convention. Non-linear schemes could also be used to enhance the grey scale data as the user determines is appropriate.

Threshold circuit 62 provides, as output data, 8-bit grey scale, a single bit bilevel or single bit half-tone, which is input to I/O circuit 64 for output to a PC type environment.

The power supply and lamp driver circuit 70 of FIG. 2 provides for control of optical and imaging circuit 30 with novel method to preheat filaments of fluorescent lamp 34, to avoid sputtering of tungsten off the filament, as will be described.

Referring now to FIG. 3, a more detailed diagram of the optical and imaging circuit 30 of FIG. 1 is depicted. In FIG. 3, the CCD array 38 receives internal clock and master clock signals 80, 82 respectively (in addition to the scanned optical data from document 36).

CCD array 38 outputs two signals, one of which is the analog and video out on lead 39 to the preamplifier 40 of FIG. 1. CCD array 38 also outputs a black reference pulse on lead 41, which is used for black reference or DC restoration.

Analog video data on lead 39 has a stable dark output which is the darkest output that could ever come from CCD array 38. The black reference pulse on lead 41 allows DC restoration or relation of output video to a DC reference point.

CCD array 38 generates the black reference pulse on lead 41 after processing of timing signals 80, 82.

A closed loop servo circuit of FIG. 3 provides the dark reference restoration, which eliminates errors that would be in typical clamping circuits used in video processing techniques.

The servo circuit includes a buffer 84 which has inherent errors of its own in both DC offset and temperature drift. Buffer 84 is capacitively coupled by capacitor 86 to the analog output of preamplifier 40. The DC reference point is established by closing switch S1 at the appropriate time in the video circuit signal which has a dark reference pedestal, as depicted in FIG. 3B.

When switch S1 is closed, a pulse is provided from CCD array 38 which controls the closing of switch S1, as depicted in FIG. 3A. When switch S1 is closed, amplifier 88 compares the output point against a fixed reference (typically ground). This comparison forces the dark reference point to zero volts. The closed servo circuit 90 of FIG. 3A eliminates the required manufacturing step in prior art approaches which requires adjustment during manufacture (such as setting a potentiometer). FIG. 3A provides a preamplifier which incorporates an automatic dark reference or black reference control circuit.

FIG. 4 depicts a diagram of a pixel compensation capability according to the present invention. The present invention provides for pixel compensation utilizing an incremental algorithm to be described.

Pixel compensation is provided in video processing techniques to compensate for variations in each individual pixel in the CCD array. It is desired to make all pixels have same sensitivities, and also compensate for rolloff in the fluorescent lamp and for any raised cosine rolloff in the lens of FIG. 1.

The pixel compensation technique, according to the present invention, provides for compensation of unpredictable spatial response of a lamp, such as different positions of the lamp, where there might be different brightnesses.

FIGS. 5A–5C depict the responses of the lamp, the CCD array and the lens, with the analog composite signal depicted in FIG. 5D. FIG. 5D is the analog video input into pixel compensation circuit 100 of FIG. 4. The analog video data is multiplied by the value of 0.5 in multiplier 102 for input to adder 104. Part of the analog video signal goes to multiplier 106, where it is multiplied by a signal having a variable value anywhere between 0 and 1. The variable signal is provided by a digital to analog converter (DAC) 110.

The variable multiplied signal from multiplier 106 is also input to adder 104 to provide for compensated video on lead 112. The range of the compensation that can be applied is 0.5–1.5 (1±0.5)

The variable value is characterized as epsilon (1±e) and is provided by values stored in a data RAM 114 as opposed to an EPROM. The data for the RAM 114 is supplied by a microprocessor during a compensation cycle that takes place upon initialization or at any time the user desires. When the user compensates on white paper, the correction factors are stored in the compensation RAM and also on application software. In this way, when the system is re-initialized, the results of the last previous compensation will be downloaded. RAM 114 is addressed by pixel counter 116 which in turn is driven by a master clock.

The compensation data is self-contained and with microprocessing, the present invention is able to perform compensation at any time that is determined, either on power up or during page scanning.

The pixel compensation provides for storing compensation data in RAM and using a power up routine to do the compensation.

Referring now to FIG. 6, a gamma compensation circuit is depicted. The basic function of gamma compensation is to receive compensated video data and provide compensated digital output data.

In FIG. 6, the compensated video data is input in part to an analog to digital converter (A/D) 120. The gamma compensation circuit of FIG. 6 also utilizes a multiplying digital to analog converter (MDAC) 122, which multiplies the compensated video signal with a particular value incremental between 0 and 1 in 1/16th steps via 4-bit lead 124.

Also, the gamma compensation circuit provides for a second MDAC 126, which provides for multiplying a 4-bit signal on lead 128 with a reference voltage. The outputs from MDACs 122, 126 are input to adder 130, which provides the output V IN K1+V REF K2 for input to A/D 120.

The output of A/D 120 is video data (digital). The purpose of gamma correction is to provide extended dynamic range which allows for quantitization of darker portions of the analog video data. This provides more quantitization steps in the darker portion of the image than in the lighter portion of the image.

Without gamma correction, linear conversion of the video signal would give more quantitization steps in light areas of a document. This may be undesirable, as the white areas are not in general needed, as with darker areas of the document.

Prior art approaches to gamma correction have utilized resistor values, sometimes applied to an adder. The present invention provides utilization of MDACs for improved dynamic compensation.

Figure 7:
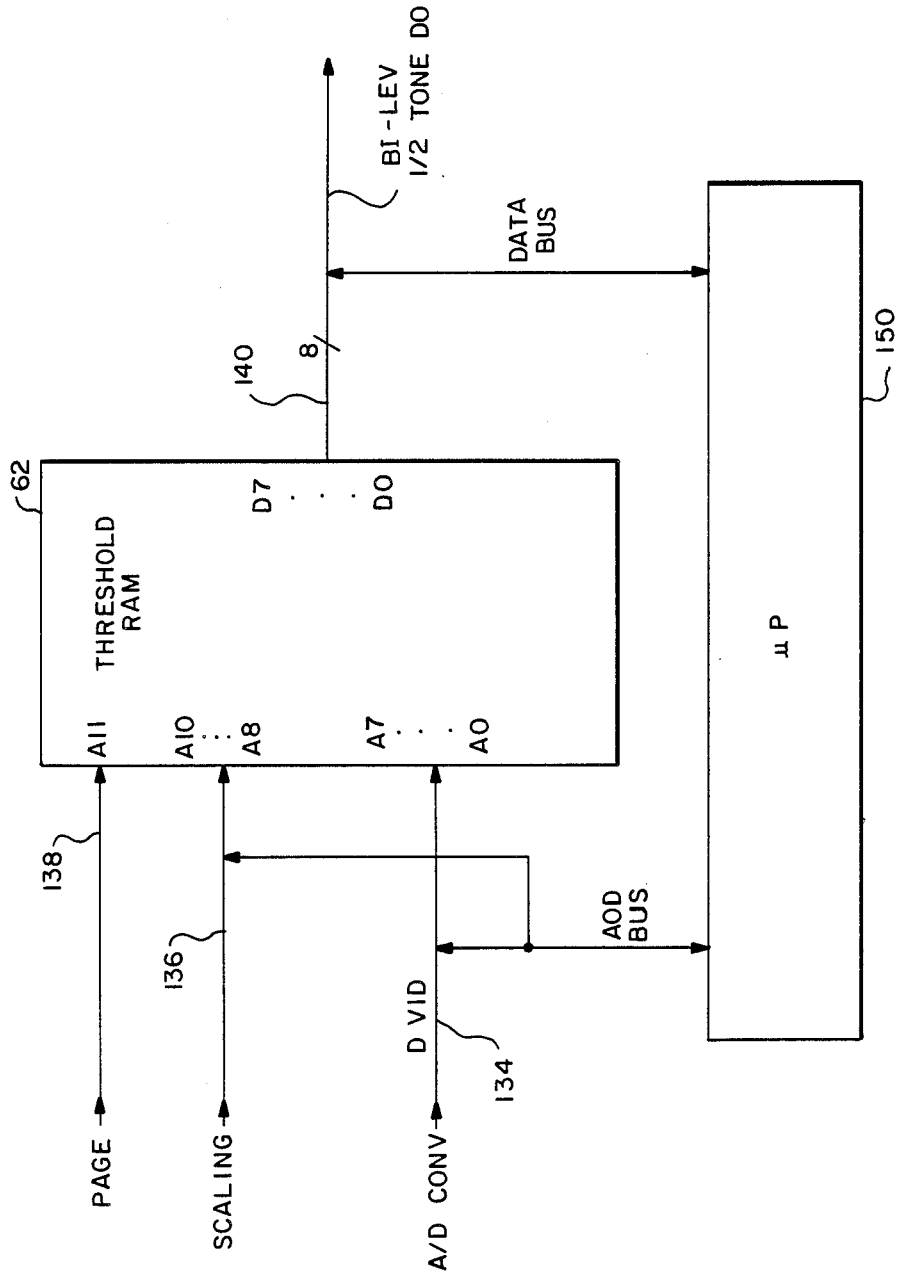
FIG. 7 depicts a more detailed diagram of a threshold RAM of FIG. 2.

Referring now to FIG. 7, the threshold RAM 62 of FIG. 2 is depicted in more detail. The threshold RAM of FIG. 7 is partially addressed by the digital video data on the 134 from FIG. 6. This provides suitable addressing for address bit locations A0 through A7, as depicted in FIG. 7.

Threshold RAM 62 also receives address data from a scaling circuit via lead 136, which is the 3 bits for address locations A8 through A10. The last address bit is a page bit on lead 138 for input to address location A11 of RAM 62. This determines what page of memory to address, which provides bilevel threshold function.

As previously described, the bilevel function is for the black/white decision based upon a fixed threshold, which is 1 bit.

The bilevel and-half-tone data are each single bits, and are on address data location D0 on lead 140 (an 8-bit bus). The bilevel and half-tone data only require a single bit on lead 140.

Microprocessor (UP) 150 provides the ability to control address and data buses 134, 136, 140, so that the actual values stored in a memory map can be read to or read from. The data can be altered in an arbitrary manner, and can be filled with a microprocessor control scheme for changing half-tone or changing the transfer function in grey scale.

UP 150 can lighten or darken an image by rewriting the memory map in RAM 62, either in bilevel, half-tone or grey scale loads. UP 150 can configure or reconfigure threshold RAM 62 to lighten or darken the image, as required.

Figure 8:
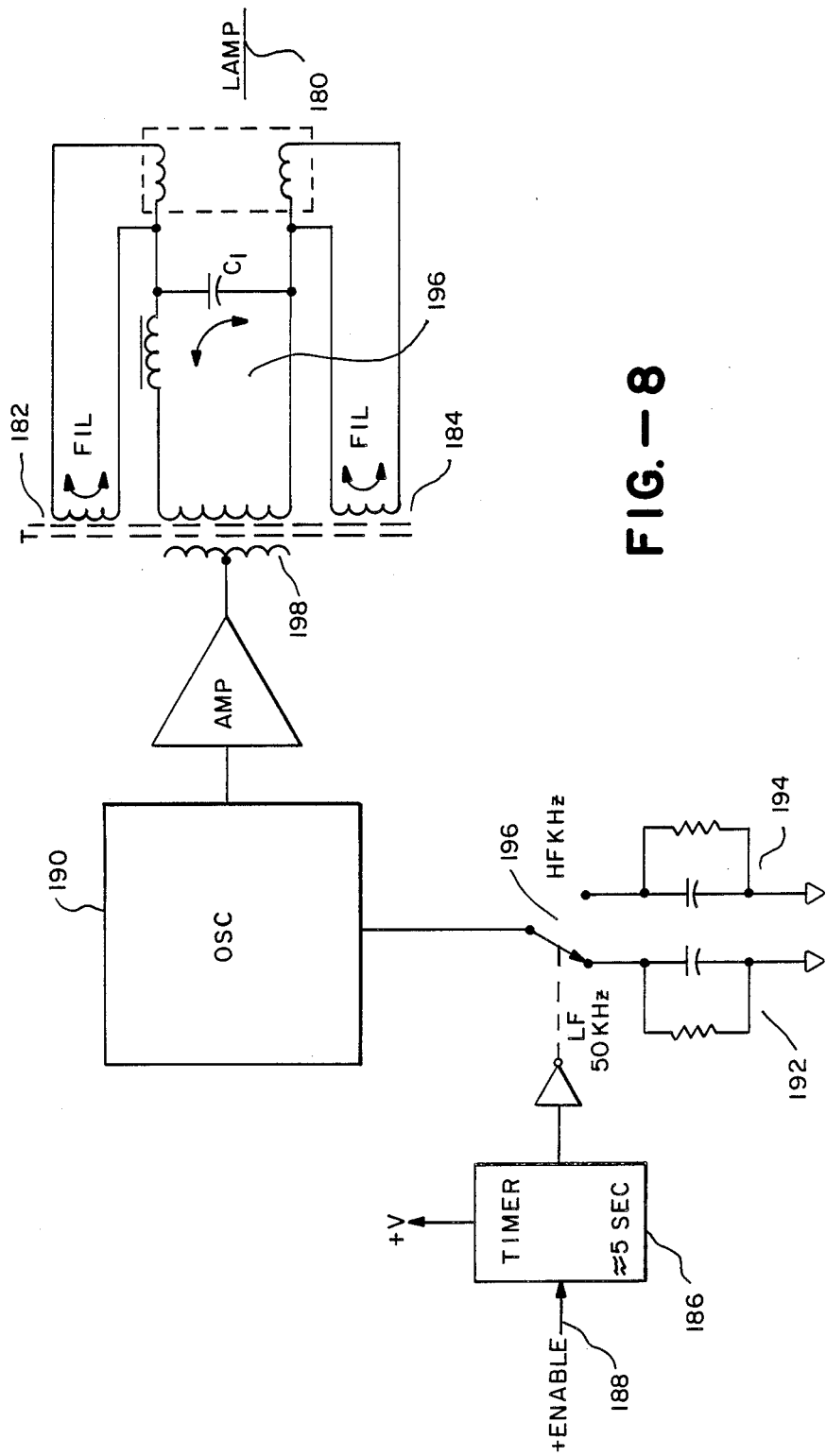
FIG. 8 depicts a lamp control circuit which forms a portion of FIG. 2.

Referring now to FIG. 8, the aspects of the control of the fluorescent lamps of FIG. 2 are depicted in more detail. It is an objective to preserve the output of the fluorescent lamps of FIG. 2, depicted as lamp 180 in FIG. 8.

Fluorescent lamp 180 is designed to operate in what is called a rapid start mode, which means that the filaments 182, 184 are preheated before high voltage is applied to strike an arc. If filaments 182, 184 are not preheated, then there is some risk of lamp 180 either not starting or sputtering tungsten off the filaments of the lamp into the envelope of the lamp which would degrade its output.

In FIG. 8, a timer 186 is started, which locks out any enable signals on lead 188. On one embodiment, the time lockout is approximately 5 seconds, and timer 186 will not allow any enable signals until after that timeout period.

The function of the circuit is to switch between two oscillating modes, as controlled by oscillator 190. The first oscillating mode is a low frequency mode and the second oscillating mode is a high frequency mode.

During the timeout period the high frequency mode (approximately 2 KHz) is enabled and resonant circuit 194 provides the high frequency mode of operation.

The high frequency mode of operation is above the resonant point of resonant circuit 196, comprising L1, C1. In a high frequency mode of operation, L1, C1 form a filter and the oscillating frequency is above the cutoff for that filter. Consequently, circuit 196 acts as a low pass filter.

The circuit is operating above cutoff, so no high voltage or current gets to lamp 180 through transformer 198. Thus, with no high voltage or current getting to lamp 180, there is no striking of an arc. However, high frequency currents still flow in the filament circuits. 182, 184 so that the filaments are being preheated.

After the timeout period is over, oscillator 190 switches through switch 196 to a low frequency mode controlled by circuit 192. The low frequency mode of operation does resonate L1, C1, which then forms a very high voltage which is enough to strike an arc to lamp 180. The arc is sustained through current that can flow through inductor L1.

FIG. 8 provides a rapid start ballast function without using mechanical relays to perform the same function. The 200 KHz mode of operation provides for preheating the filaments 182, 184. The normal mode of operation of about 50 KHz provides for the necessary striking of an arc. However, filaments 182, 184 are not particularly frequency sensitive, so that the different modes of operation will not affect the preheating requirement.

However, the striking of an arc utilizing high voltages requires circuitry which is frequency sensitive. By controlling the frequency, the present invention can hold off the arc or disable the lamp and still keep filaments 182, 184 hot, which is an advantage in that the system can run at lower power levels when the scanner is not being utilized.

In prior art approaches electromechanical devices are utilized, which is in general expensive and unreliable. The present invention provides a filter during the high frequency mode of operation. As the lower frequency mode of operation is switched into, L1 and C1 form a resonant circuit which provide a high voltage sufficient to strike an arc.

Once an arc is established, circuit 196 is no longer used as a resonant circuit, and C1 is essentially "swamped" by the low impedance of the lamp. C1 is then essentially out of the circuit, and L1 is utilized as a series reactance in much the same way as ballasts are used.

Hence, the power control circuit of FIG. 8 provides three modes of operation with the same components. Further, nothing is being stressed as compared to prior art approaches. Typically, in rapid start ballast circuits, there are mercury switches that get stressed and wear out after a period of time, as well as stressful high voltages applied to a lamp.

What is claimed is:

1. A document scanner comprising means for scanning a document having graphics or text information thereon in order to generate analog video signals representative of said information, video processing means for processing said analog video signals to generate digital video signals corresponding to said analog signals wherein said video processing means include adaptive pixel compensation means for providing pixel compensation for each pixel corresponding to said analog video signals in a real time fashion, said adaptive pixel compensation means including means for generating a variable value signal having predetermined values between a first value and a second value, and means for multiplying said variable value signal and said analog video signals to provide said pixel compensation for each said pixel, optical imaging means for generating said analog video signals including means for generating a black reference pulse signal and a closed loop servo circuit responsive to said output video signals to a DC reference point.

means for scanning said document having graphics or text information thereon in order to generate analog video signals representative of said information.

said video processing means including means for processing said analog video signals to generate digital video signals corresponding to said analog signals wherein said video processing means include adaptive pixel compensation means for providing pixel compensation for each pixel corresponding to said analog video signals in a real time, optical imaging means for generating said analog video signals, said optical imaging means including fluorescent lamps and control means for controlling said fluorescent lamps, means for preheating the filaments of said fluorescent lamps during a predetermined time frame, and means for initiating a first oscillating mode of operation such that only said filaments are preheated wherein said optical imaging means include means for switching to a second frequency mode of operation for operating said fluorescent lamp.

2. A scanner as in claim 1 further including threshold circuit means including random access memory means for providing changeable bilevel, half-tone or grey scale conversion for said digital video signals.

3. A document scanner as in claim 2 further including gamma compensation means for providing an extended dynamic range of said analog video data.

4. A document scanner as in claim 3 wherein said gamma compensation means include multiplying digital to analog converter means and analog to digital converter means to provide gamma compensation for each pixel in real time.

5. A document scanner comprising means for scanning a document having graphics or text information thereon in order to generate analog video signals representative of said information, video processing means for processing said analog video signals to generate digital video signals corresponding to said analog signals wherein said video processing means include adaptive pixel compensation means for providing pixel compensation for each pixel corresponding to said analog video signals in a real time, optical imaging means for generating said analog video signals, said optical imaging means including fluorescent lamps and control means for controlling said fluorescent lamps, means for preheating the filaments of said fluorescent lamps during a predetermined time frame, means for initiating a first oscillating mode of operation such that only said filaments are preheated wherein said optical imaging means include means for switching to a second frequency mode of operation for operating said fluorescent lamp.

* * * * *